March 31, 1959     A. L. EVERITT ET AL     2,880,027
RESILIENT COUPLING FOR INDEPENDENTLY ROTATABLE ELEMENTS
Filed May 24, 1957

INVENTORS
Allen L. Everitt
James E. Frederick
BY
Their Attorney

United States Patent Office 2,880,027
Patented Mar. 31, 1959

2,880,027

RESILIENT COUPLING FOR INDEPENDENTLY ROTATABLE ELEMENTS

Allen L. Everitt and James E. Frederick, Dayton, Ohio, assignors to General Motors Corporation, Detroit, Mich., a corporation of Delaware Application May 24, 1957, Serial No. 661,353

5 Claims. (Cl. 287—85)

This invention relates to bushings and is particularly concerned with a resilient bushing for use in connection with at least two control arms for independently controlling torsional deflections of said arms.

It is an object of this invention to provide a multiple control bushing capable of independently controlling the torsional deflection of at least two control arms wherein the bushing comprises inner and outer metal sleeves separated by a single elastomeric member which is preloaded and in a state of compression, one of said metal sleeves being formed from a plurality of concentrically arranged segments each connectible to a separate control arm whereby each segment and its related control arm may be independently torsionally deflected through said elastomeric member.

In automotive suspension systems and the like, it is highly desirable to insulate portions thereof against transmission of vibration and noise and to simultaneously permit limited rotational or torsional movement of the parts through an insulating bushing whereby strains are eliminated and a degree of control of the suspension activities is accomplished. In the past it has been standard procedure, wherein two control arms are attached to a single stud, for example, to provide two separate bushings so that the control arms may be independently deflected and their torsional rates independently controlled. The present invention is directed to a novel bushing which reduces the cost of these shock absorbing connections and permits independent torsional deflection of two or more control arms while presenting a unitary bushing which expedites assembly and reduces improper alignment, etc.

Furthermore, the present invention provides additional desirable effects within the elastomeric portion of the bushing since in instances when a single elastomeric member is used it is subjected to torsional wind-up, by movements of either control arm, thereby self-adjusting the other control arm and conditioning it for subsequent operation.

Further objects and advantages of the present invention will be apparent from the following description, reference being had to the accompanying drawings wherein preferred embodiments of the present invention are clearly shown.

Figure 1:
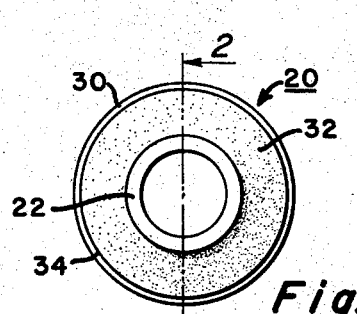
Figure 1 is a plan view of one type of bushing as disclosed herein.
Figure 2:
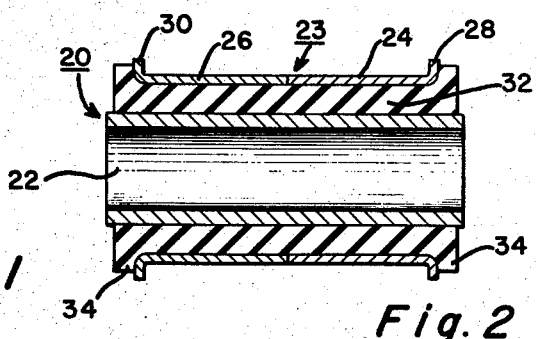
Figure 2 is a sectional view of the bushing in Figure 1 taken on the line 2—2 thereof.
Figure 3:
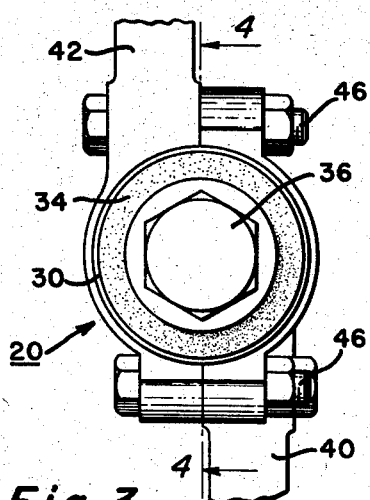
Figure 3 is a plan view of the bushing shown in Figure 1 with two control arms assembled thereto.
Figure 4:
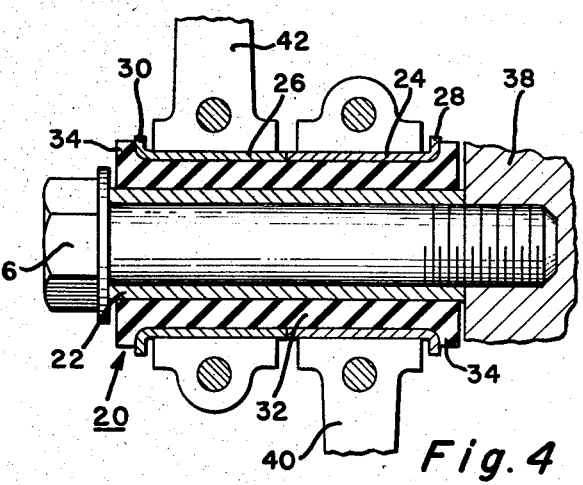
Figure 4 is a sectional view taken on line 4—4 of Figure 3.

Referring to the drawings, in Figures 1 and 2, one form of our novel bushing 20 is shown wherein a central or inner metal sleeve 22 is concentrically arranged within an outer metal sleeve 23 comprising two abutting metal sleeve segments or members 24 and 26. Each of these sleeve segments has an end flange 28 and 30, respectively, thereon in opposed relation to one another. Interposed between the inner metal sleeve 22 and the outer metal sleeve 23 is a single elastomeric member 32 which is preloaded upon sleeve 22 and compressed within the sleeve segments 24 and 26.

The elastomeric member 32 preferably has an inner dimension less than the outer dimension of the inner sleeve 22 and an outer dimension greater than the inner diameter of the outer sleeve 23. Thus, when the elastomeric member 32 is installed over the inner sleeve 22, it is in a preloaded condition and, when it is forced within the outer sleeve 23, it is compressed, the degree of preload and the amount of compression being used to control the torsional deflection rates of the bushing.

The assembly of this bushing should be carried out under the teachings of copending application S.N. 452,755, assigned to the assignee of the present invention, wherein critical dimensional considerations are set forth. In other words, it is desirable to move equal areas of elastomer during the preload and compression of the bushing at both the inner and outer surfaces taken in a plane perpendicular to the axis of the bushing. This results in equalized compression at the inner and outer surfaces thereof and prevents the bushing from becoming disassembled. In this connection, it has been known that where all or substantially all of the compression takes place adjacent one surface of the bushing that there is a tendency for the entire assembly to become disassembled.

Referring specifically again to Figure 2, it will be noted that the elastomeric portion 32 thereof, in its compressed condition, is slightly longer than the assembled outer sleeve segments 24 and 26 so that when the entire bushing is assembled, beads or end portions 34 extend outwardly over the flanges 28 and 30. This condition, while preferable in the present instance, is not necessarily limiting and may be eliminated in some cases if the design of the bushing so dictates without disturbing the dual control effect of the bushing.

Figure 6:
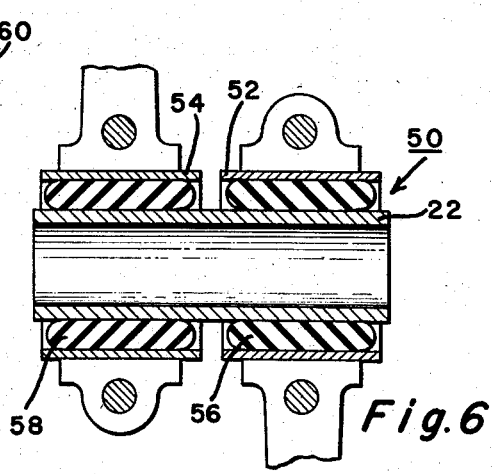
Figure 6 is a modification of the bushing wherein completely independent operation of the several control arms is accomplished.

When the bushing 20 is installed in a suspension assembly, a bolt or stud 36 is passed through the inner sleeve 22 and is threaded into an abutment or support 38. In this position, the inner sleeve 22 is nonrotatable and is held firm to the support 38. Two control arms 40 and 42 are clamped around the outer metal sleeve segments 24 and 26, respectively, in nonrotative relation thereto by means of bolts 46. The control arms 40 and 42 are attached at their opposite ends to other portions of the suspension system and, as movement occurs at the other points of support of arms 40 and 42, the arms tend to deflect or rotate which causes torsional movement of the respective outer sleeve segments 24 or 26 which torsional movement is controlled by the elastomeric member 32. It is apparent that, if the members 40 and 42 are rotating in opposite directions, that the elastomeric member 32 is wound up which modifies the torsional rate of the bushing, or, if the arms 40 and 42 rotate through different angles, a decreased wind-up is observed in the elastomeric member. For the most part, this wind-up tends to condition the bushing and gives a very uniform control. However, if it is desired that the two control arms should operate with complete independence of one another, the device which is shown at 50 in Figure 6 may be used. In this embodiment, two separated outer sleeve members 52 and 54 are used with the single inner sleeve 22. Interposed therebetween are two separate elastomeric bushings 56 and 58. In this embodiment, it is apparent that the two control arms operate with complete independence of one another and that the elastomeric bushings have no effect upon one another due to wind-up. In most instances, however, the single elastomeric bushing is preferable since there is an interrelation between movements of the control arms which tends to condition the bushing for more uniform and smoother operation.

Figure 5:
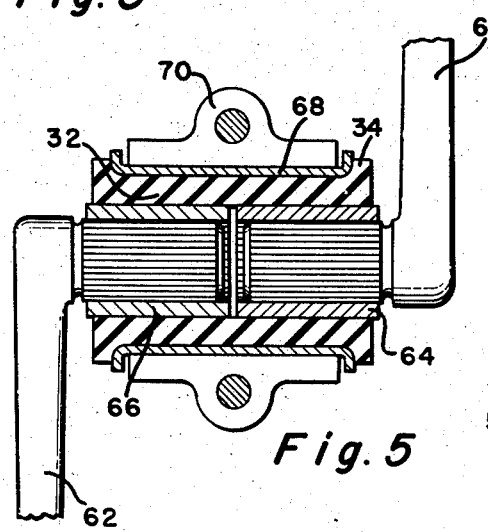
Figure 5 is a modification of the bushing disclosed in Figures 1 through 4 wherein the control arms operate on the inner sleeve of the bushing.

Another embodiment of the device is shown in Figure 5. Here the same bushing is described as shown in Figures 1 and 2 except the control arms 60 and 62 are attached to separated and concentrically arranged inner sleeve segments 64 and 66, respectively, through splines or knurls provided on the several parts. The outer sleeve 68 is a continuous flanged sleeve and the elastomeric bushing 32 is the same as is used in connection with the device shown in Figures 1 and 2. In this embodiment, the outer metal sleeve 68 is held nonrotatable by a clamp 70 attached to a support, not shown.

It is apparent that the embodiment shown in Figure 5 is the same in all respects to that shown in Figures 1 and 2, except that the control arms are attached to the inner metal sleeve rather than the outer metal sleeve.

With respect to all of the embodiments, it is understood that more than two control arms may be utilized if desired, in which case additional separated inner or outer sleeves are necessary.

The elastomeric member or members as used in the bushings described herein may be of any suitable elastomeric materials such as natural rubber, butadiene styrene copolymers, butadiene acrylonitrile copolymers, polychloroprene, etc., or any compatible mixtures thereof, or, in fact, any elastomeric material which will satisfactorily dampen vibration and control rates of deflection.

It is also manifest that an adhesive cement may be used to attach more firmly the elastomer to the metal parts. Cements for adhering any of the aforementioned elastomers to metal are well known and form no part of this invention.

It is also apparent that control factors for a given bushing may be determined by the preload used at assembly and that such adjustments form no part of this invention.

While the forms of embodiment of the present invention as herein disclosed constitute preferred forms, it is to be understood that other forms might be adopted.

What is claimed is as follows:

1. A multiple control bushing for independently controlling the torsional deflection of at least two control arms, comprising in combination; inner and outer metal sleeves, wherein one of said sleeves comprises at least two concentric and independently deflectable tubular members and a compressed and preloaded elastomeric portion interposed between said inner and outer sleeves, whereby the concentric members making up said one sleeve can be torsionally deflected independently of one another with respect to the other sleeve.

2. The bushing claimed in claim 1 wherein the inner sleeve consists of two or more concentric tubular members.

3. The bushing claimed in claim 1 wherein the outer sleeves consist of two or more concentric tubular members.

4. A dual control bushing for independently controlling the dimensional deflection of two control arms, comprising in combination; an inner metal sleeve, two concentrically arranged and independently deflectable outer metal sleeves surrounding said inner metal sleeve and spaced therefrom, and a compressed and preloaded elastomeric bushing interposed between the outer metal sleeves and the inner metal sleeve, whereby the two outer metal sleeves can be torsionally deflected independently of one another with respect to the inner metal sleeve.

5. A dual control bushing for independently controlling the torsional deflection of two control arms, comprising in combination; an inner metal sleeve, two independently deflectable outer metal sleeves arranged concentrically and in abutting relation around said inner metal sleeve and spaced therefrom and each having an end flanged at the free end thereof, a single elastomeric bushing having an inner diameter less than the inner diameter of the inner sleeve and an outer diameter greater than the inner diameter of the outer sleeves disposed between the inner and outer sleeves, whereas said outer sleeves can be independently deflected independently of one another with respect to the inner sleeve through said elastomeric member.

References Cited in the file of this patent

UNITED STATES PATENTS

| | | |
|---|---|---|
| 1,619,087 | Pampinella | Mar. 1, 1927 |
| 2,290,678 | Dodge | July 21, 1942 |
| 2,414,743 | Kaemmerling | Jan. 21, 1947 |
| 2,482,488 | Julien | Sept. 20, 1949 |
| 2,728,593 | Hutton | Dec. 27, 1955 |
| 2,747,918 | Blackwood | May 29, 1956 |

FOREIGN PATENTS

| | | |
|---|---|---|
| 809,234 | France | Dec. 3, 1936 |